Aug. 16, 1955  R. A. B. JONES ET AL  2,715,302

GRINDING, POLISHING AND LIKE MACHINE TOOLS

Filed Sept. 14, 1953  8 Sheets-Sheet 1

United States Patent Office 2,715,302
Patented Aug. 16, 1955

2,715,302

GRINDING, POLISHING AND LIKE MACHINE TOOLS

Reginald Arthur Bishop Jones and Cyril Fairhurst, Barnoldswick, England, assignors to Rolls-Royce Limited, Derby, England, a British company Application September 14, 1953, Serial No. 379,827

Claims priority, application Great Britain September 16, 1952

11 Claims. (Cl. 51—143)

This invention relates to polishing, grinding or the like machine tools of the kind (hereinafter referred to as "the kind specified") in which an article is ground, polished or the like by bringing it into contact with a driven belt having an abrasive surface.

Blades such as are employed in compressors or turbines of gas-turbine engines usually have their leading edges formed as circular arcs of small radii of curvature, and the leading edge is blended in to the concave and convex surfaces of the blade by adjacent portions of greater radii of curvature. During the operations of polishing, grinding, or the like, the blade is in contact with say an abrasive belt on a line extending from the root to the tip of the blade. Over that portion of the leading edge formed as a circular arc, the surface will form part of the surfaces of a cylinder (if the root leading edge radius is the same as the tip leading edge radius) or of a frustum of a cone (if the root radius differs from the tip radius), and the abrasive belt will be tangential to the surface of the leading edge on the same radial line from the root to the tip of the blade. It is therefore merely necessary to rock the blade relative to the belt about the axis of the cylindrical or frusto-conical surface in order to effect the machining operation.

However, the relation between the radii of curvature at the tip and root sections changes in the adjacent portions of the blade surface, for example the root radius may be increased relative to the tip radius so that the cone angle of a frusto-conical part of the leading edge surface may be increased in the adjacent portions of the blade surface. Rocking of the blade relative to the belt about the axis of the leading edge surface when operating on the adjacent portions of the surface would therefore cause undercutting of one end of the blade, thus causing an undesirable discontinuity in the surface; in the example given, if the belt were maintained in contact with the tip surface the increased radius part of the surface from the tip towards the root would be undercut to a progressively increased amount.

This invention has for an object to provide an improved machine tool of the kind specified whereby the curved edges of articles, such as the leading edges of blades for use in turbines or compressors of gas-turbine engines, can be ground, polished or the like without producing such undesirable discontinuities at the junction of the ground portion with the remainder of the surface.

According to the present invention, a machine tool of the kind specified comprises means to support an article to be machined in working contact with the driven abrasive belt with the axis of generation of the edge of the article extending transversely of the belt, and means to effect relative angular movement of the article and the belt about the axis of generation of the edge of the article and at least during the end portions of the angular movement simultaneously gradually to increase the angle between said axis and the working surface of the belt as the angular movement approaches the limit and vice versa.

Preferably it is arranged that the article is supported for rotation about the axis of generation of its edge and the belt is supported to be displaced to effect the increase of the angle between said axis and the belt during the end portions of the angular movement.

Where the article to be machined has, as is usual for a turbine or compressor blade, a curved edge which has a greater radius of curvature at one end than at the opposite end so that the leading edge is in effect a part of a cone, it will preferably be arranged that the angle between the axis and the working surface of the belt will be increased so that an increase in the distance between the axis and the belt will occur adjacent the larger radius end of the curved edge which is greater than the increase in the corresponding distance at the smaller radius end of the edge.

According to an important and preferred feature of this invention, the driven abrasive belt is a continuous belt carried on pulleys mounted in a cradle supported to swing about an axis which is in a plane containing the centre line of the operative portion of the belt and also supported so that one end of the centre line can be displaced at right angles to the centre line.

One embodiment of the machine tool of this invention suitable for polishing or grinding the leading edges of compressor or turbine blades will now be described by way of example, the description making reference to the accompanying drawings in which:

The machine tool (Figures 1 and 2) comprises a main frame and housing structure 10 including a top plate 11 on which is carried a cradle 13 which hangs in a well 12 in the housing 10 and supports a driven abrasive belt 14, and also comprises a workholder support frame 15 carried on the main frame and housing structure 10.

The main frame and housing has a pair of spaced plates 16, 17 upstanding from the upper surface of the top plate 11 along the back edge of the mouth of the well 12 and the spaced plates carry the work-holder support frame 15 and accommodate between them a drive by means of which the workpiece is rotated.

Figure 1:
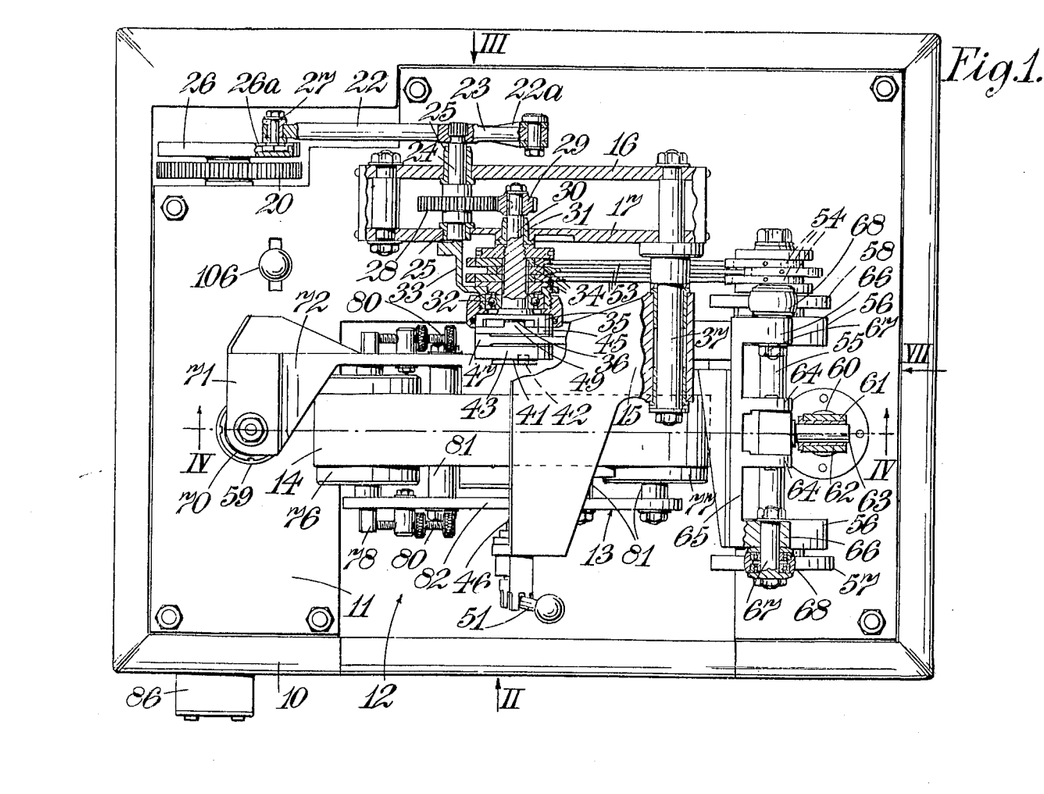
Figure 1 is a plan view of the machine tool with parts broken away, and with other parts omitted.
Figure 3:
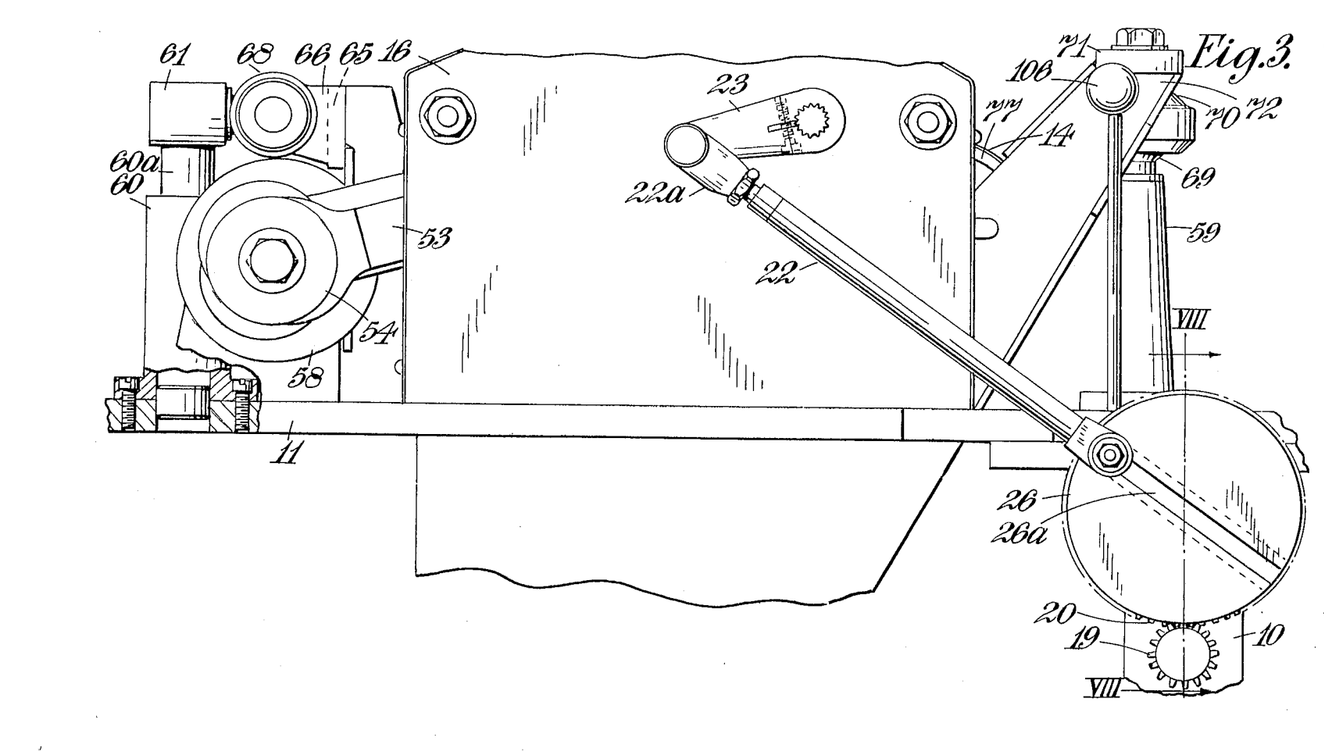
Figure 3 is a view in the direction of arrow III on Figure 1 with parts broken away.

Accommodated within the main frame and housing 10 there is an electric motor 18 which drives through suitable gearing 19, 20 a main crank-shaft 21 on which is mounted a crank wheel 26 (Figures 1 and 3). The wheel 26 is slotted diametrically as indicated at 26a and at a point eccentric to its axis of rotation there is clamped a pivot 27 for one end of a main connecting rod 22, the opposite end of which is formed with a fork 22a embracing a crank arm 23 secured on a horizontal spindle 24 mounted in bearings 25 in the upstanding plates 16, 17.

Figure 5:
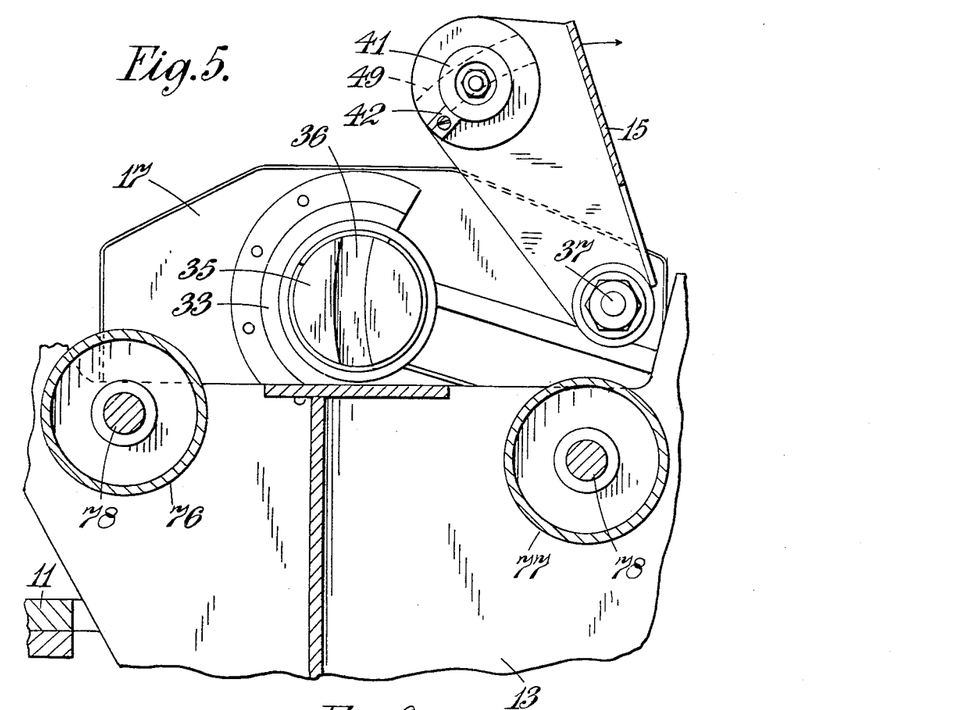
Figure 5 is a view similar to that of Figure 4 showing a detail.

It is arranged that for a full revolution of the crank wheel 26, the crank arm 23 at said opposite end of the connecting rod 22 is rocked backwards and forwards once through about 80°. The spindle 24 of the crank arm 23 carries a pinion 28 which meshes with a second pinion 29 carried on a parallel spindle 30 which is mounted in a bearing 31 in the upstanding plate 17 and a bearing 32 accommodated in a housing 33 secured on the plate 17. The spindle 30 carries a series of three eccentric discs 34 and beyond them a first coupling member 35 through which a drive is transmitted to the workpiece. The coupling member 35 (Figure 5) is a cylindrical or disc-like piece coaxial with the spindle 30 and has in an end surface thereof an arcuate groove 36 the centre of curvature of which is on the swinging axis of the work-holder support frame 15 which is supported to swing on a fixed spindle 37 secured in the upstanding plates 16, 17 in spaced but parallel relation to the spindle 30 of the second pinion 29. The gear ratio between the pinions 28, 29 is such that the first coupling member rotates through an angle of about 160°.

Figure 6:
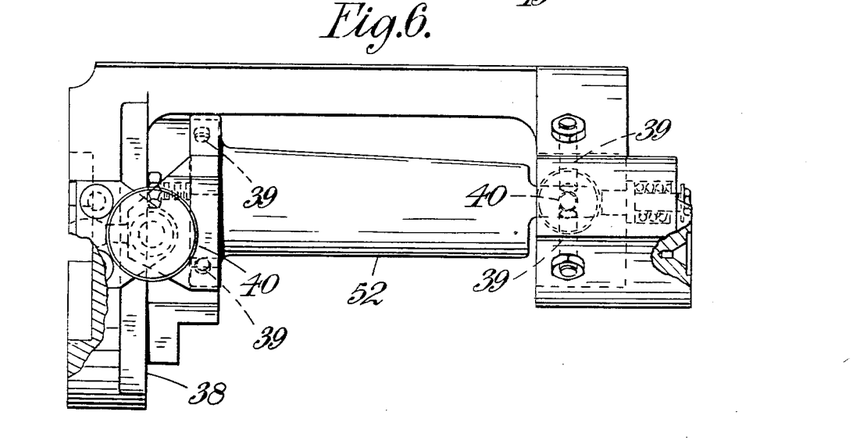
Figure 6 is a view showing a blade mounted in a work-holder and showing details of construction of the work-holder.

A work-holder 38 (Figures 4, 5 and 6) is rotatively supported in the work-holder support frame 15 and comprises a frame with locating stops 39 to position the blade with the axis of generation of its leading edge coincident with the axis of rotation of the work-holder, and clamping means 40 by which the ends of a blade can be gripped to secure the blade accurately in position against the stops 39. The frame of the work-holder 38 has, at one end, a recess and a notch to fit over a central boss 41 and offset tenon 42 on a drive plate 43 which is secured by a nut and bolt 44 to a second coupling member 45, and has at its opposite end a recess to be engaged by a centre spindle 46. The second coupling member 45 and the drive plate 43 are rotatively supported in a ring 47 (Figure 1) forming part of the work-holder support frame 15, and the second coupling member 45 has on one face an arcuate rib 49 adapted to engage in the arcuate groove 36 in the first coupling member 35 above referred to. The centre spindle 46 is mounted in the work-holder support frame 15 coaxially with the drive plate 43 and second coupling member 45 and is loaded by a spring 50 towards them. A lever 51 is pivoted on the support frame 15 and engages the outer end of the centre spindle 46 to enable it to be withdrawn against the spring 50 to permit the work-holder 38 to be placed in position.

The blade element 52 is secured in position in the work-holder 38 with the work-holder support frame 15 swung upwardly on its spindle 37 and with the first and second coupling members 35, 45 disengaged and thereafter the work-holder support frame 15 is swung about its spindle 37 to bring the rib 49 on the second coupling member 45 into engagement with the groove 36 on the first coupling member 35 and thus to bring the axis of the leading edge of a blade 52 positioned in the work-holder 38 into line with the axis of the spindle 30. A drive can now be transmitted from the pinion 29 through the first and second coupling members 35, 45, and drive plate 43 to the work-holder 38.

Figure 7:
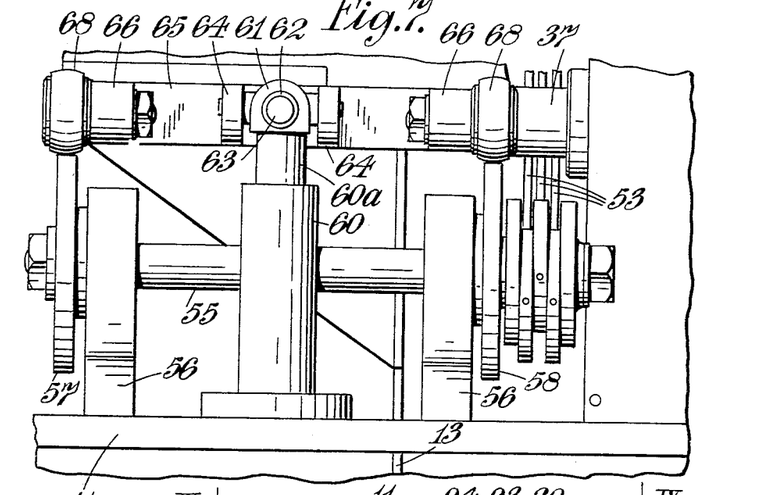
Figure 7 is a view in the direction of arrow VII on Figure 1.

The three eccentric discs 34 carried on the spindle 30 have their centres angularly offset from one another by 120° and each drives a link 53 (Figures 1, 3 and 7) which is engaged at its opposite end with a corresponding eccentric disc 54 mounted on a horizontal camshaft 55 which is rotatively mounted in brackets 56 upstanding from the top plate 11 of the main frame and housing structure 10 along one side edge of the well 12 so that the camshaft 55 has its axis parallel to the axis of rotation of the work-holder 38. The camshaft 55 has secured on it a pair of axially-spaced cams 57, 58, and they are thus positively rotated to same angular extent as the second pinion 29 (and thus as the blade 52).

Mounted on the top plate 11 of the frame and housing structure 10 are a pair of vertical pillars 59, 60 one pillar being adjacent each side edge of the well 12, and the belt cradle 13 above mentioned is suspended from the pillars 59, 60 (Figures 1, 2, 3, 4 and 7).

The pillar 60 is secured to the top plate 11 adjacent the cam shaft 55 and midway between the cams 57, 58, and is in the form of a tubular guide in which is slidably engaged a guide pin 60a which is therefore capable of vertical movement relative to the main frame and housing structure 10. The guide pin 60a is formed at its upper end with a cylindrical socket 61 to receive a bearing bush 62 in which is engaged a horizontally-directed pivot pin 63 which is secured to and projects from between a pair of lugs 64 on a frame member 65 which is substantially parallel to and above the camshaft 55 and which forms part of the belt cradle 13. Secured to lugs 66 at the ends of this frame member 65 are a pair of stub spindles 67 each carrying a follower roller 68, the rollers 68 co-operating one with each of the cams 57, 58 carried by the cam shaft 55.

The other pillar 59 is secured to the top plate 11 on the opposite side of the well 12 and carries at its upper end a ball member 69 which is engaged in a spherical socket provided in a member 70 secured to a lug 71 on another part 72 of the frame of the belt cradle 13.

It will be clear that as the cams 57, 58 carried by the camshaft 55 rotate so the follower rollers will be raised and lowered and the cradle 13 is free to swing about the axis of the pivot pin 63 engaged in the bush bearings 62 carried by the first pillar 60 (and thus about an axis roughly at right angles to the rocking axis of the work-holder 38), and this end of the cradle 13 is also free to move vertically by sliding of the guide pin 60a in the tubular guide of the pillar 60. The opposite end of the cradle 13 is supported by the ball and spherical socket for universal movement and thus allows for these movements.

Figure 2:
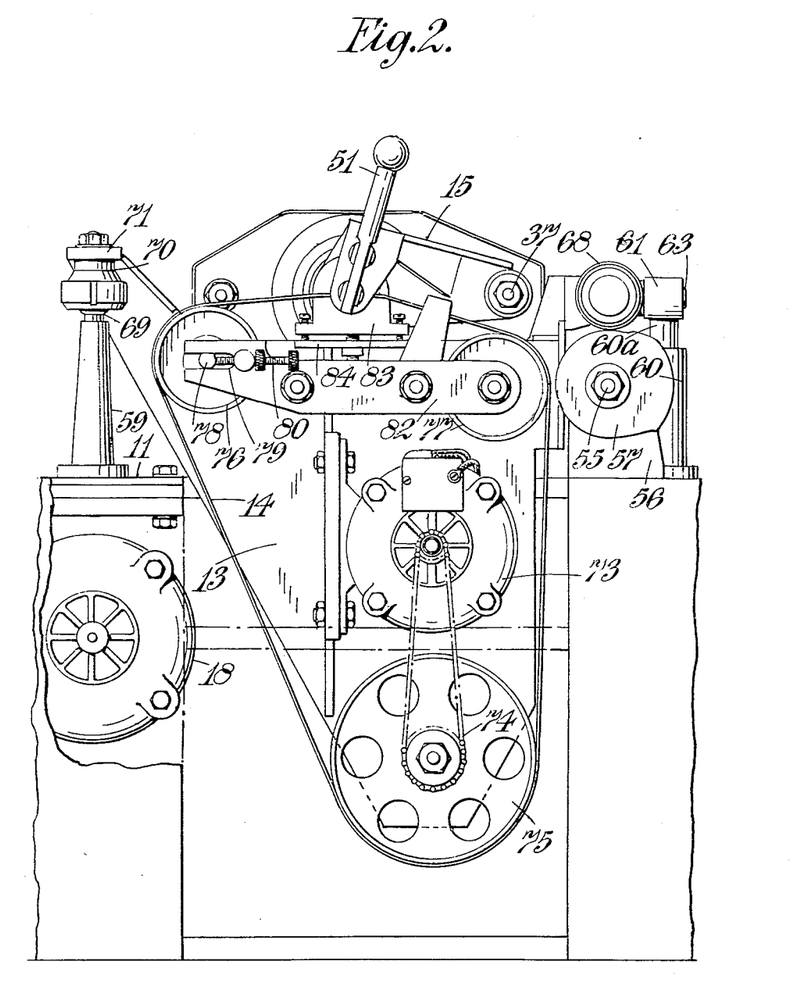
Figure 2 is a view in the direction of arrow II on Figure 1 of part of the machine tool.
Figure 4:
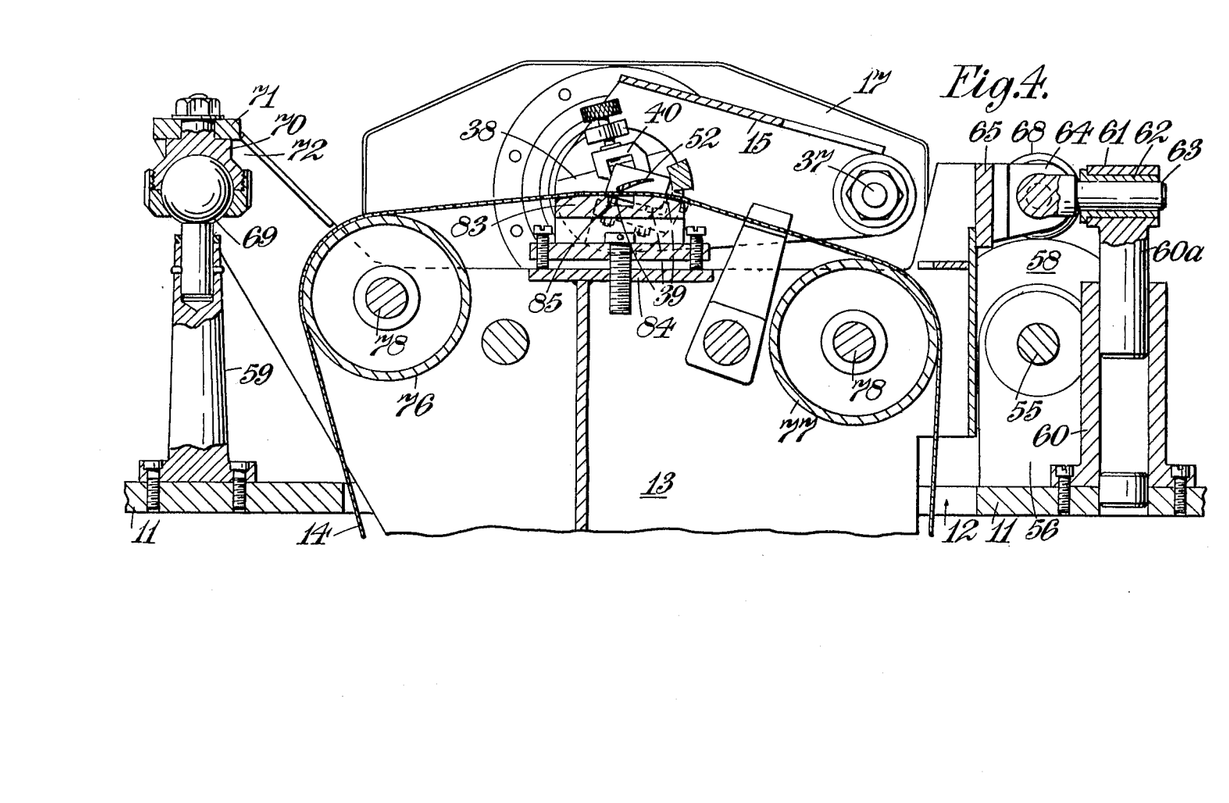
Figure 4 is a section on the line IV—IV of Figure 1.

Referring now to Figures 1, 2 and 4, the abrasive belt 14 is a continuous belt and is supported in the cradle 13 to travel with its centre line in a plane containing the swinging axis of the cradle 13. The cradle 13 has mounted on it an electric motor 73 which drives the belt 14 through a driving chain 74 and a main pulley 75 which is journalled in the cradle at its lowermost point. There are also journalled in the cradle 13 a pair of idler pulleys 76, 77 disposed with their spindles roughly in a horizontal plane and just below the level of the swinging axis of the cradle 13. The spindle 78 of the pulley 76 is engaged in slots 79 in the cradle 13 and is adjustable towards and away from the pulley 77 by means of adjusting screws 80. The spindle of the pulley 77 is fixed and may be formed by one of a number of distance pieces 81 holding an auxiliary frame member 82 in spaced relation to the rear wall of the cradle 13.

A pressure block 83 is mounted on a platform 84 extending from the main cradle frame 13 between the pulleys 76, 77. The pressure block 83 is formed in its upper surface with a channel 85 extending parallel to the axes of the idler pulleys 76, 77 and the surface of the block 83 on each side of the channel is of convex curvature having its highest point at the edges of the channel 85. The belt 14 is looped over the main pulley 75 and the idler pulleys 76, 77, and between the idler pulleys 76, 77 lies in contact with the curved surfaces of the block 83 on each side of the channel 85. Above the channel 85 the belt is substantially horizontal.

The pressure block 83 is so disposed between the idler pulleys that when the work-holder support frame 15 is swung downwardly so that the first and second coupling members 35, 45 are engaged, the leading edge of the blade element 52 in the work-holder 38 comes into contact with the belt 14 just above the channel 85 in the pressure block 83.

The machine tool also comprises starter switch gear 86 (Figure 1) for the two electric motors 18, 73 which switch gear may be of any known or convenient kind.

There is also provided a manually-operable clutch mechanism between the motor 18 and the shaft 21 of the crank wheel 26. The clutch includes a trip mechanism so that after the crank shaft has made one complete revolution the clutch is automatically disengaged.

Figures 8, 9:
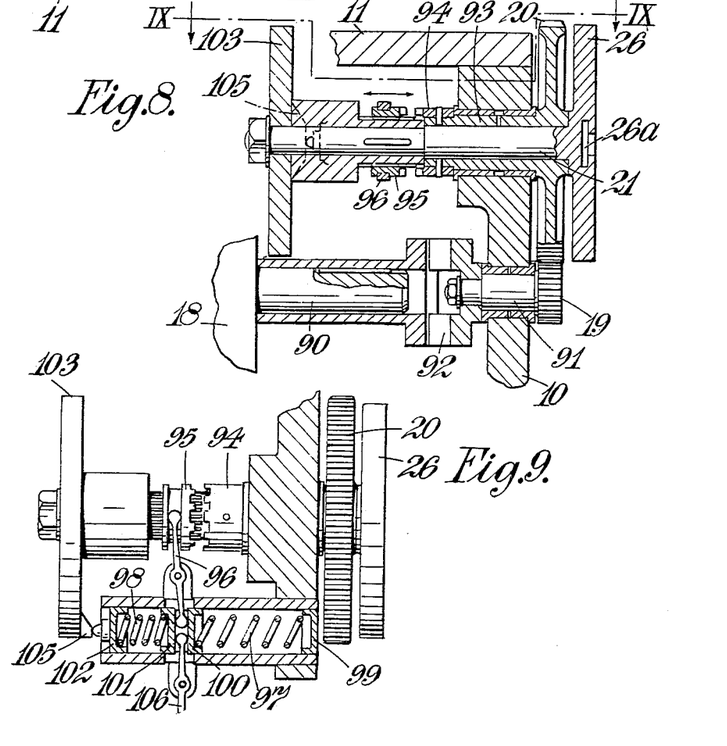
Figure 8 is a section on the line VIII—VIII of Figure 3.
Figure 9 is a section on the line IX—IX of Figure 8, Figures 10, 10A, 11 and 11A illustrate the operation of the machine tool.

Referring to Figures 8 and 9, the shaft 90 of the motor 18 drives the shaft 91 of the gear element 19 through a coupling 92, and the shaft 93 of the gear element 20, which shaft 93 is hollow and coaxial with the shaft 21, drives the shaft 21 through a dog clutch, one element 94 of which is secured on the shaft 93 and the other element 95 of which is rotatable with but slidable along shaft 21 under control of a pivoted striker fork 96. The fork 96 is spring loaded by a pair of compression springs 97, 98, of which spring 97 has one fixed abutment 99 and an abutment 100 on a slidable collar which bears on the fork 96, and of which the spring 98 has one abutment 101 bearing on the opposite side of the fork 96 and a second abutment 102 which is movable towards and away from the fork 96 by a cam disc 103 rotatable with shaft 21. The cam disc 103 has generally a peripheral surface which allows abutment 102 to move to the left so permitting the fork 96 to be rocked by spring 97 to engage the dog clutch 94, 95, but has a local land 105 to displace abutment 102 to the right and thereby to move fork 96 to disengage the dog-clutch 94, 95. The abutment 101 can also be displaced by a manually-operated lever 106 to permit engagement of the dog-clutch 94, 95.

In operation, the motor 18 is started with the land 105 holding the clutch 94, 95 disengaged. The lever 106 is then rocked to compress spring 98 and engage the dog clutch and the lever is held until, due to rotation of the shaft 21, the land 105 is clear of the abutment 102 when the clutch will be held engaged by the spring 97. At the end of a complete revolution of shaft 21 the land 105 again engages the abutment 102 and effects disengagement of the dog-clutch 94, 95. Thus although the motor 18 may be rotating continuously the crank shaft 21 and crank wheel 26 make only a single revolution for each operation of the lever 106.

It will be clear that the first and second coupling members 35, 45 through which the work-holder 38 is rocked, can only be engaged when the crank arm 23 (and thus the crank shaft) is in one particular position and it is arranged that they are in this position when the land 105 of the cam disc 103 is in the clutch-disengaging position, and also when the coupling members are in this position, the blade 52 mounted in the work-holder 38 is at one limit of its angular travel.

Figures 10, 10A:
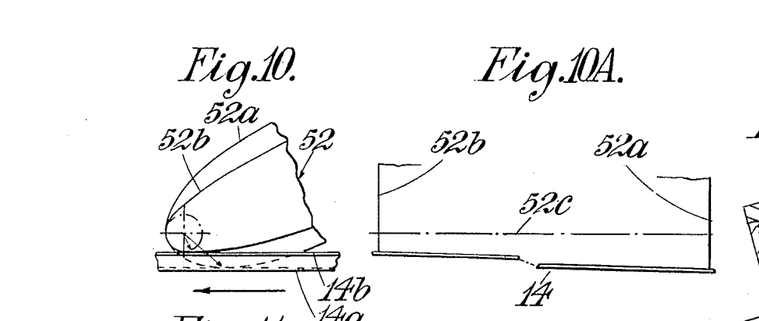
Figures 11, 11A:
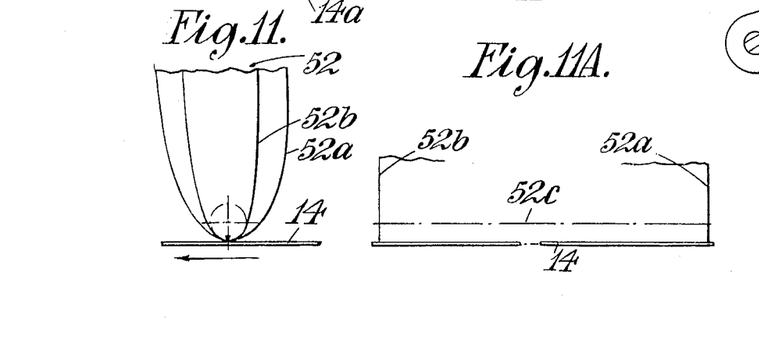

In use of the machine tool, for example to finish the edge of a tapering blade element 52 having at its leading edge a root section such as 52a and a tip section such as 52b, the two cams 57, 58 are so arranged that during the initial portion of the 160° of angular travel of the camshaft 55 the follower rollers 68 and thus the cradle 13 are raised to bring the abrasive belt 14 into contact with the workpice 52. In the initial position of contact (Figures 10, 10A) the abrasive belt 14 is at an angle to the axis 52c of the circular arc portion of the leading edge of the blade 52, so that the distance between the axis 52c and the belt is greater at the root section 52a of the blade (as indicated at 14a) than at the tip section 52b (as indicated at 14b, Figure 10). The cams 57, 58 are such that over, say, about 35° of travel at one end of the angular travel of the cam shaft 55 the cradle 13 is rocked so that the angle between the abrasive belt 14 and the axis 52c of the leading edge of the blade is gradually decreased. Over that portion of the leading edge which is formed as a circular arc, say, about the next 75° of travel of the camshaft 55, the angle between the abrasive belt 14 and the axis 52c of the leading edge radius is maintained constant (Figures 11, 11A), and is equal to half the cone angle if the leading edge surface is frusto-conical and equal to 0° if the leading edge surface is cylindrical. Over the last 50° of travel the cams 57, 58 are shaped so that the angle between the belt 14 and the axis 52c of the leading edge is again increased gradually, by the roller 68 co-operating with the cam 58 at that end of the cam shaft 55 corresponding with the root end 52a of the blade 52 being lowered to a greater degree than the roller 68 co-operating with the cam 57 corresponding with the tip end 52b of the blade 52. At the end of this portion of the travel the cams 57, 58 are provided with a step so that the rollers 68 corresponding to both the root and tip ends of the blade 52 are lowered on to a dwell portion and the abrasive belt 14 is thus lowered away from the blade 52 while the latter is still being rotated to avoid the formation of a flat on its surface.

The blade 52 is arranged to make a double pass in contact with the abrasive belt, that is to say the operation may commence when the chord of the blade makes an acute angle with the abrasive belt and part of the convex surface of the blade is adjacent the belt 14, and may be rocked through almost 160° until the chord of the blade makes an acute angle with the belt with the concave surface of the blade adjacent the belt, and then is rocked back to the original position. It may be arranged, where desirable in order to obtain an improved finish, that the blade makes four or more passes in contact with the belt, in place of the double pass which occurs in the machine described.

Figure 12:
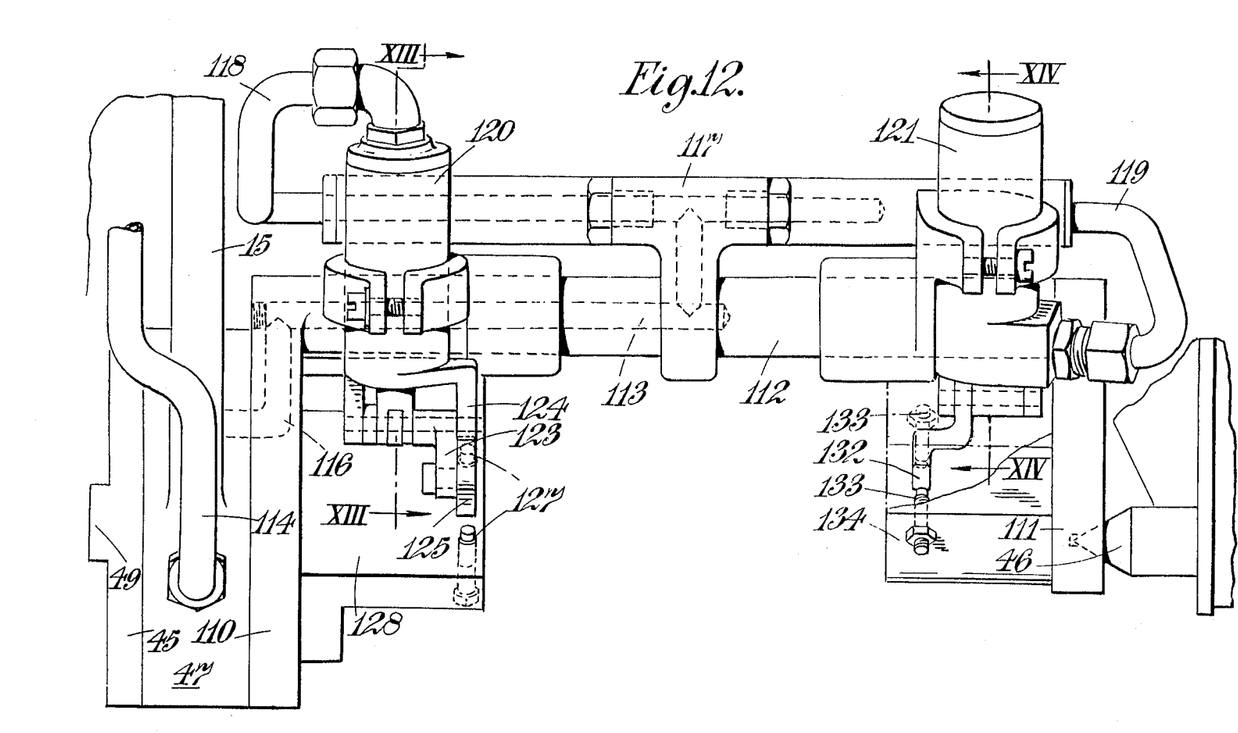
Figure 12 illustrates an alternative form of work holder to that shown in Figure 6, and Figure 13 and 14 are sections on the lines XIII—XIII and XIV—XIV of Figure 12.
Figures 13, 14:
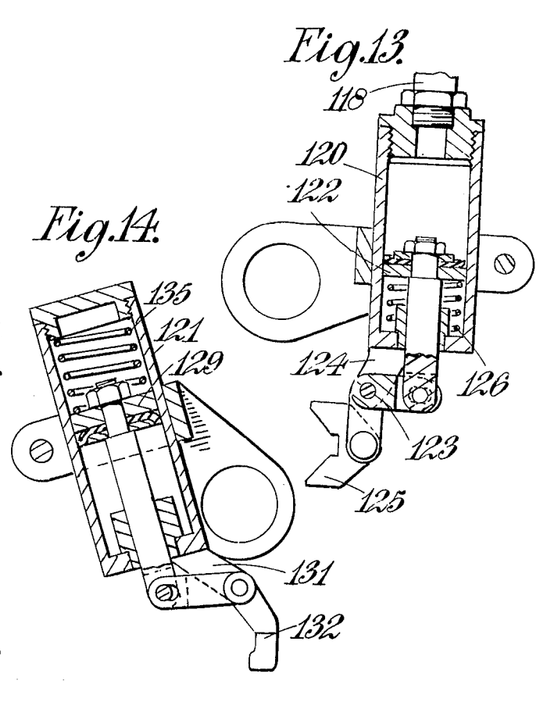

Referring now to Figures 12 to 14, there is illustrated an alternative form of work holder 38 in which the workpiece is clamped pneumatically or hydraulically.

The work-holder 38 comprises end plates 110, 111 connected together by a bar 112 having a longitudinal bore 113 extending part way along it from the plate 110. The plate 110 is secured to the second coupling member 45 to rotate therewith. The ring 47 forming part of the work-holder support frame 15 has a pressure supply connection 114 thereon and the connection is connected through drillings 116 to one end of the bore 113. The opposite end of the bore communicates with a T-piece 117 which is connected by pipes 118, 119 to a pair of rams 120, 121 which are secured at opposite ends of the bar 112.

The ram 120 has a ram piston 122 which is connected to rock a bell-crank lever 123 pivoted on a bracket 124 and carrying at the end of one of its arms a pivoted fork 125. A spring 126 urges the piston 122 to one end of the ram and pressure fluid supplied to the ram 120 moves the piston 122 against the spring 126 and through the pivoted fork 125 clamps one end of a workpiece 52 against adjustable stops 127 mounted in a bracket 128 on the plate 110.

The ram 121 has a piston 129 which is connected to rock a bell-crank 130 pivoted on a bracket 131 and arranged on pivoting in one direction to bear by an end of one of its arms 132 on the other end of the workpiece 52 to clamp it against adjustable stops 133 set in a bracket 134 on the end plate 111. A spring 135 loads the piston 129 in a direction to disengage the end 132 from the workpiece 52 and the supply of pressure fluid to the ram 121 moves the piston 129 against the action of the spring.

We claim:

1. A machine tool comprising a machine frame structure; a cradle; a plurality of pulleys mounted in said cradle; first drive means to drive one of said pulleys; an endless abrasive belt mounted to travel on said pulleys; means to support said cradle to swing in said machine frame structure about a swinging axis contained in a plane substantially containing an operative portion of said abrasive belt and substantially parallel to the centre line of the belt, and comprising a guide member slidable in said machine frame structure at right angles to said swinging axis, a pivotal connection between said guide member and one end of said cradle to permit the cradle to swing about said swinging axis, a support member on the machine frame structure adjacent the opposite end of said cradle, and a universal connection between said support member and the cradle; a workholder mounted in said machine frame structure for limited angular movement about a rocking axis extending over the belt transversely of its direction of travel and adapted to carry an article with an edge thereof in contact with said operative portion of the belt to be machined to a curve about said rocking axis; second drive means connected to effect said limited angular movement of the workholder about said rocking axis; and third drive means connected to effect the swinging of said cradle in selected relation to the limited angular movement of the workholder in the sense that during an initial portion of said angular movement of the workholder from one limit of its angular movement the cradle is swung to decrease the angle between the rocking axis and the operative portion of the belt and in the sense that during a final portion of the movement of the workholder to the other limit the cradle is swung to increase said angle.

2. A machine tool as claimed in claim 1, wherein said third drive means comprises cam and follower means between said machine frame structure and said cradle, the cam means being moved in selected relation to the limited angular movement of the workholder.

3. A machine tool as claimed in claim 2, wherein the cam and follower means includes a cam shaft carrying a pair of spaced cam members and a pair of follower members carried by said cradle in corresponding spaced relation, one on each side of the swinging axis of said cradle, and a driving connection from said second drive means to rotate said cam shaft simultaneously with the limited angular movement of said workholder.

4. A machine tool as claimed in claim 3, wherein said second drive means includes a rotatable spindle carrying a first coupling member, said driving connection interconnecting said spindle and said cam shaft, and a second coupling member carried by said workholder and adapted to co-operate with said first coupling member to be rotated thereby.

5. A machine tool as claimed in claim 4, comprising also a workholder support frame pivoted in the machine frame structure to swing about an axis parallel to but offset from the spindle axis, said second coupling member being journalled in said work-holder support frame, a centre spindle mounted on said work-holder support frame coaxially with said second coupling member, said work-holder being adapted to be rotatively supported in said work-holder support frame by said second coupling member and said centre spindle, and being adapted to be rotated by said second coupling member relative to said work-holder support frame.

6. A machine tool as claimed in claim 5, wherein one of said coupling members has a channel therein curved about the pivot axis of the work-holder support frame and the other of the coupling members has a correspondingly curved rib thereon to be engaged with said channel on swinging of the work-holder support frame into a position in which the article is brought into contact with the belt.

7. A machine tool as claimed in claim 1, comprising also a pressure block having therein a channel flanked by convexly curved surface portions one on each side of the channel, said pressure block being arranged in contact with the belt on the opposite surface thereof to the article being ground or polished and so that the article is in contact with a portion of the belt above the channel.

8. A machine tool comprising a machine frame structure, a travelling abrasive belt supported in said machine frame structure, first drive means to drive the belt, a workholder mounted in the machine frame structure, second drive means adapted to effect limited relative angular movement of said belt and said workholder about an axis which extends transversely of the direction of travel of the belt, said workholder being adapted to support an article with an edge thereof in contact with the abrasive surface of the belt to be machined to a curve generated about said axis, third drive means connected to operate in a selected relation to said second drive means and adapted to effect relative movement of said belt and said workholder to vary the angle which said axis makes with the surface of the belt, in the sense gradually to decrease said angle during an initial portion of said relative angular movement from one limit of the angular movement and in the sense gradually to increase the said angle during a final portion of said relative angular movement to the other limit.

9. A machine tool according to claim 8, wherein said third drive means is adapted to vary said angle during said initial portion of the relative angular movement in a sense to decrease the distance between said axis and the belt at substantially all points therein, and during said final portion of the angular movement to increase the distance between said axis and the belt at substantially all points.

10. A machine tool as claimed in claim 8, comprising support means adapted to support said abrasive belt for its travel and adjustably mounted in said machine frame structure, said third drive means being connected to adjust the position of the support means to effect said variation of the angle between the axis and the belt.

11. A machine tool as claimed in claim 8, comprising also a cradle and a plurality of pulleys rotatively mounted in said cradle, the belt being continuous and being carried by the pulleys, said first drive means being connected to rotate one of said pulleys, said cradle being mounted in the machine frame structure to swing about a swinging axis which lies in a plane substantially containing the portion of the belt with which the article is in contact, said third drive means being connected to cause swinging of said cradle about its swinging axis.

References Cited in the file of this patent

UNITED STATES PATENTS

| | | |
|---|---|---|
| 2,426,764 | Czarnecki | Sept. 2, 1947 |
| 2,431,822 | Murray | Dec. 2, 1947 |

FOREIGN PATENTS

| | | |
|---|---|---|
| 682,447 | Great Britain | Nov. 12, 1952 |